United States Patent
Ala-Laurila et al.

(10) Patent No.: US 6,587,680 B1
(45) Date of Patent: Jul. 1, 2003

(54) TRANSFER OF SECURITY ASSOCIATION DURING A MOBILE TERMINAL HANDOVER

(75) Inventors: Juha Ala-Laurila, Tampere (FI); Harri Hansén, Espoo (FI); Juha Salvela, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/447,761

(22) Filed: Nov. 23, 1999

(51) Int. Cl.[7] .......................... H04M 1/66; H04M 1/68; H04M 3/16
(52) U.S. Cl. .................... 455/411; 455/435; 455/437; 455/438; 380/248; 380/270; 380/272
(58) Field of Search ..................... 455/411, 435–439; 380/247, 248, 270–273; 370/331, 332

(56) References Cited

U.S. PATENT DOCUMENTS

| | | | | |
|---|---|---|---|---|
| 5,204,902 A | * | 4/1993 | Reeds, III et al. ............ 380/23 |
| 5,237,612 A | * | 8/1993 | Raith ........................... 380/23 |
| 5,598,459 A | * | 1/1997 | Haartsen ....................... 379/58 |
| 5,778,075 A | | 7/1998 | Haartsen ....................... 380/49 |
| 6,014,085 A | * | 1/2000 | Patel ........................ 340/825.34 |
| 6,026,293 A | * | 2/2000 | Osborn ........................ 455/411 |
| 6,370,380 B1 | * | 4/2002 | Norefors et al. ............. 455/436 |

FOREIGN PATENT DOCUMENTS

| EP | 0 939 519 A1 | 9/1999 |
|---|---|---|
| WO | WO 00/49827 | 8/2000 |

OTHER PUBLICATIONS

ETSI, "DTR/BRAN–00230002 V0.1.0, 99/03/29, High Performance Radio Access Local Area Network—Type 2—System Overview", Broadband Radio Access Networks, an ETSI Project, 29/03/99.

Korhonen, Markku "IPv6 Key Management", Tik–110.551 Internetworking Seminar, Department of Computer Science, Helsinki University of Technology.

* cited by examiner

*Primary Examiner*—Thanh Cong Le
*Assistant Examiner*—Tuan Tran (57) ABSTRACT

An existing security association is re-established when a communication handover event occurs in a radio communications system such as IEEE 082.11 or a HIPERLAN wherein the existing security association between a mobile terminal and a wireless communication network is maintained when the communication handover occurs within the network. Authentication during a handover event is achieved by a challenge/response procedure. In accordance with the challenge/response procedure each member of a communication pair that is made up of a new access point and the mobile terminal that is experiencing a handover to the new access point sends a challenge to the other member of the communication pair. Each member of the communication pair then calculates a response to its received challenge, and these responses are sent back to the other member of the communication pair. Each member of the communication pair then compares its received response to a correct response. When these comparisons are correct, payload communication begins between the second access point and the mobile terminal.

20 Claims, 11 Drawing Sheets

TRANSFER OF SECURITY ASSOCIATION DURING A MOBILE TERMINAL HANDOVER

RELATED PATENT APPLICATION

This application is related to patent application Ser. No. 09/342,367, filed Jun. 29, 1999 and entitled APPARATUS, AND ASSOCIATED METHOD, FOR SELECTABLY OPERATING RADIO DEVICE IN ALTERNATE MODE, which application is incorporated herein by reference.

FIELD OF THE INVENTION

This invention relates to radio communications systems of which a wireless local area network (WLAN) is a non-limiting example. More specifically this invention relates to providing information security when a mobile terminal is handed-over from a first base station or access point (AP) to a second base station or access point (AP).

BACKGROUND OF THE INVENTION

In a minimum configuration, a communication system is formed by a transmitting station and a receiving station that are interconnected by a communication channel. Communication signals generated by the transmitting station are transmitted upon the communication channel and received by the receiving station.

In a radio communication system at least a portion of the communication channel is formed by a portion of the electromagnetic spectrum. Increased mobility of communications is permitted in a radio communication system because a fixed or a hard-wired connection is not required between the transmitting and receiving stations.

A cellular communication system, of which a cellular telephone system is an example, is an example of a radio communication system. When the mobile terminal of a subscriber to a cellular communication system is physically positioned at almost any location throughout an area that is encompassed by the network infrastructure of the cellular communication system, the mobile terminal is able to communicate by way of the cellular communication system with another mobile terminal.

The network infrastructure of an exemplary wireless communication system includes physically spaced-apart base stations or access points (APs) which each include a transceiver. In such an exemplary system, each base station or AP defines a geographic area or cell of the communications system. As a first mobile terminal is used to communicate with a second mobile terminal, and as the first mobile terminal travels or moves between the cells of the system, uninterrupted communication is possible by handing-over communications from one base station to another base station. Such a communication handover is provided by a handover process.

A High Performance radio Local Area Network such as HIPERLAN type-2supports three kinds of handover. HIPERLAN/2 PROVIDES HIGH SPEED (typically 25 Mb/s data rate) communications between portable devices and broadband IP, ATM and UMTS networks, and is capable of supporting multiple media applications, with the typical application being indoors.

HIPERLAN/2 provides local wireless access to different infrastructure networks (e.g. IP, ATM and UMTS) by moving and stationary terminals that interact with access points which, in turn, usually are connected to an IP, ATM, or UMTS backbone. A number of access points are required to service the network. The wireless network as a whole supports handovers of connections between access points to provide mobility. Typical operating environments include business networks and domestic premises networks. An overview of HIPERLAN/2 access networks is provided by the European Telecommunications Standards Institute (ETSI) document DTR/BRAN-00230002, 1998, incorporated herein by reference.

Depending upon the mobile terminal's handover decision, sector handover (inter-sector), radio handover (inter access point transceiver/inter access point handover), network handover (inter access point/inter network handover) or forced handover may occur in accordance with HIPERLAN/2.

Prior to the execution of a handover, the mobile terminal must gather relevant measurements on the frequency that is used by the current access point, as well as on the frequencies that are used by access points that are candidates for a handover. Measurements on the serving frequency can be carried out by the mobile terminal while it is synchronized to the current access point. However, in order to measure the frequency of neighboring access points, the mobile terminal must be temporarily absent from the current access point.

During a mobile terminal absent procedure the mobile terminal is temporarily disconnected from the current access point, in order that the mobile terminal can perform measurements on neighboring access points. During this time, no communication between the mobile terminal and the current access point is possible. As part of this absent procedure, the mobile terminal tells the current access point that it will be absent for n-frames. During this absent period, the mobile terminal cannot be reached by the current access point. After the absent period, the current access point may trigger a mobile terminal alive sequence to check if the mobile terminal is available.

During a sector handover the antenna sector of the access point is changed, and the same access point controls the entire handover. After a successful sector handover, the mobile terminal communicates via the new sector. A radio handover relates to access points having more than one transceiver per access point, for example two access point transceivers and one access point controller. Radio handover is performed when a mobile terminal moves from a coverage area of one access point to another coverage area that is served by the same access point. Since radio handover can be performed within the data link control (DLC) layer, higher layer protocols (HL) are not involved. When the mobile terminal detects the need for a handover to another access point controller, the mobile terminal may still synchronize to the current access point. In this case the mobile terminal may notify its access point controller that the mobile terminal will perform a handover to another access point controller. In the case of a radio handover all relevant information about on-going connections, security parameters, etc. are available in the access point, so that this information is not re-negotiated.

A network handover is carried out when a mobile terminal moves from one access point to another access point. Since the mobile terminal leaves the serving area of a radio control link (RLC) instance, a network handover involves the convergence layer (CL) and the HL (as may be needed), as well as DLCI. To maintain HL association and connections, specific signaling via the backbone may be needed. When the mobile terminal detects the need for handover to another (target) access point, the mobile terminal may still be synchronized to the current access point. In this case, the mobile terminal may notify the current access point that it will perform a handover to another access point. The notified access point shall then stop transmitting to that mobile terminal, but shall maintain association for a specified time, when indicated.

Forced handover gives a current access point the opportunity to order a certain mobile terminal to leave the current access point's cell. A forced handover is initiated by the access point sending a Force_Handover signal to the mobile terminal. In one procedure the mobile terminal performs a normal handover and leaves its old cell, regardless of whether it finds a new cell. In a second procedure the mobile terminal has the opportunity to come back to the old access point if handover fails.

For further discussion of HIPLERLAN/2 features see the Broadband Radio Access Networks (BRAN); HIPERLAN type 2 Functional Specification; Radio Link Control (RLC) that are provided by the ETSI standardization organization, incorporated herein by reference.

Several types of wireless communication systems have been implemented, and others have been proposed, to encompass limited geographic areas, for example a limited area that is encompassed by a building or by an office workplace within a building. Wireless communication systems such as microcellular networks, private networks, and WLANs are exemplary of such systems.

Wireless communication systems are typically constructed pursuant to standards that are promulgated by a regulatory or a quasi-regulatory body. For instance, the IEEE 802.11 standard promulgated by the IEEE (Institute of Electrical and Electronic Engineering) is a wireless local area network (LAN) standard pertaining generally to the commercial 2.4 GHz wireless LAN. The 802.11 standard specifies an interface between a wireless terminal and a base station or access point, as well as among wireless terminals. Standards pertaining to a physical layer and a media access control (MAC) layer are set forth in such a standard. This standard permits automatic medium sharing between different devices that include compatible physical layers. Asynchronous data transfer is provided for in the standard, generally by way of the MAC layer, utilizing a carrier sense multiple access with collision avoidance (CSMA/CA) communication scheme.

While the IEEE 802.11 standard provides for wireless communications through the use of mobile terminals that are constructed to be mutually operable pursuant to such a standard, the standard does not adequately provide for real time wireless services. For instance, in an implementation of the standard a significant loss of quality is sometimes experienced during handover of communications from one AP to another AP. Excessive numbers of data frames are susceptible to being lost or delayed, resulting in the loss of communication quality, or even termination of communications. Operational modes different than that set forth in the IEEE 802.11 standard are therefore required, particularly for real time wireless services. Proprietary functions have been proposed which permit improved quality of communications as compared to operation pursuant to the existing IEEE 802.11 standard. APs and mobile terminals that are operable to perform such proprietary functions are referred to as being proprietary mode capable.

However, both ends of a communication pair, consisting of a mobile terminal and the AP through which the mobile terminal communicates, must be capable of operation in the proprietary mode. If both ends of the communication pair are not together operable pursuant to the proprietary mode, conventional operation pursuant to the IEEE 802.11 standard is required. Therefore, prior to permitting both ends of the communication pair to operate in the proprietary mode, a determination must be made of the ability of both ends of the communication pair together to be operable pursuant to the proprietary mode.

The above mentioned copending patent application provides apparatus that is operable to identify whether both ends of the communication pair are together operable in the proprietary mode, the apparatus operating to activate both ends of the communication pair to operate in the proprietary mode when it is determined that pair-compatibility exits, and the apparatus thereafter operating to maintain the proprietary mode operation during handover procedures should a mobile terminal physically move from a cell that is serviced by a first AP to a cell that is served by a second AP.

In addition to the valuable features that are provided by the apparatus of this copending application, it would be desirable to re-establish a security association as such an AP-to-AP handover occurs.

Many customers, and particularly business environments, require a high degree of data security, and this data security cannot be compromised by use of a WLAN installation. Since access to the WLAN cannot be restricted physically, it is customary to use crytographical methods to protect transmitted data and network elements. Current IEEE 802.11 and ITEF Internet standards offer two complementary mechanisms for providing secure data communications over a wireless link, i.e. Internet Protocol Security (IPSEC). IPSEC is an IP-based security protocol that provides FOR secure communication between two IP hosts. A common use of the IPSEC protocol is in the building of Virtual Private Networks (VPNs).

In WLAN systems the IPsec protocol can be used to provide end-to-end security for data packets, this security being provided by authenticating and/or encrypting the transmitted data packets. IPsec uses symmetric cryptography that requires use of the same encryption and/or authentication key at both ends of a communication link. Sealable key management protocols such as IKE can be used to generate the symmetric keys for an IPsec stack.

While the Internet Key Exchange (IKE) key management protocol is useful for the establishment of an IP level security association during an initial mobile-terminal/access-point association, when the need for a communication handover occurs, the use of IKE or other similar protocols inflicts a considerable time delay on accomplishing the handover since such protocols require the exchange of multiple messages, the their use of public key encryption requires very heavy computation. Since a handover of the payload traffic can be resumed only after an active security association has been established between the new-AP and the mobile terminal, the use of the IKE key management protocol or other such protocols presents problems during the handover.

When any security protocol with a dynamic encryption key, i.e. a session-dependent dynamic key, is applied between a mobile terminal and an AP, it is desirable to find a mechanism for the transfer of an active security association from one AP to another AP, as the mobile terminal moves within the coverage that is provided by the wireless radio network or system.

It is in light of this background information that the present invention provides a low or short delay method/apparatus for the key management and security association re-establishment during a WLAN communication handover, wherein there is no need to modify the end-to-end security association during handover (e.g. IPsec payload connections between the mobile terminal and a server), and wherein the handover affects only the security functions between the mobile terminal and the new and old APs.

SUMMARY OF THE INVENTION

This invention relates to radio communications, to the IEEE 802.11 2.4 GHz WLAN standard, to high performance radio local area networks (HIPERLANs), to the ETSI HIPERLAN type 2 standard, and to IPSEC level security association between a wireless terminal and network elements. The invention finds utility in any IP based wireless network, examples of which include ETSI BRAN and IEEE 802.11. In addition the invention finds utility when a mobile terminal moves between two IPSEC router entities where a wireless terminal communicates with an endpoint that is not a wireless access point.

The present invention provides an efficient method/apparatus for re-establishing an existing security association when a handover event occurs in a radio communications system such as an IEEE 802.11 or a HIPERLAN. Operation of this invention increases handover performance, and minimizes the delay that is associated with re-negotiating an security association between a new AP and a mobile terminal.

The invention provides an efficient way to maintain an established security association between a mobile terminal and the wireless communication network when a handover occurs within the network. An example of the utility of the invention is a WLAN having Internet Protocol Security (IPsec) based security association between the APs and the mobile terminals that are within the WLAN. However, the invention also finds utility for maintaining any type of dynamic security association, such as HIPERLAN/2 radio level security functions.

In accordance with the invention, authentication of a mobile terminal during a handover event is achieved by a challenge/response procedure. In accordance with this challenge/response procedure the new AP sends a challenge to the mobile terminal, whereupon the mobile terminal (MT) responds by sending a response to the new AP.

An authentication key for both ends of the communication pair that is made up of a mobile terminal and an AP is originally generated by a scaleable key management protocol, for example Internet Key Exchange (IKE). Security associations are transferred between the various APs that are within the wireless communication system in order to avoid the need for a new and different key exchange during each handover.

The keys and their related information are requested by a new AP during a handover process, and the keys and other information are transferred from the old AP to the new AP in one or more handover messages that pass between the old AP and the new AP. The exchange of authentication challenges and the responses thereto are integrated into handover signaling that occurs between the new AP and the mobile terminal that is involved in the handover.

In accordance with a feature of the invention, the messages are medium access control (MAC) messages.

It is to be noted that this invention's feature of providing access point authentication is a desirable but an optional feature.

While a secure connection is preferred between access points, such a feature is not required by the spirit and scope of the invention.

These and other features and advantages of the invention will be apparent to those of skill in the art upon reference to the following detailed description of the invention, which description makes reference to the drawing.

DETAILED DESCRIPTION OF THE INVENTION

Figure 1:
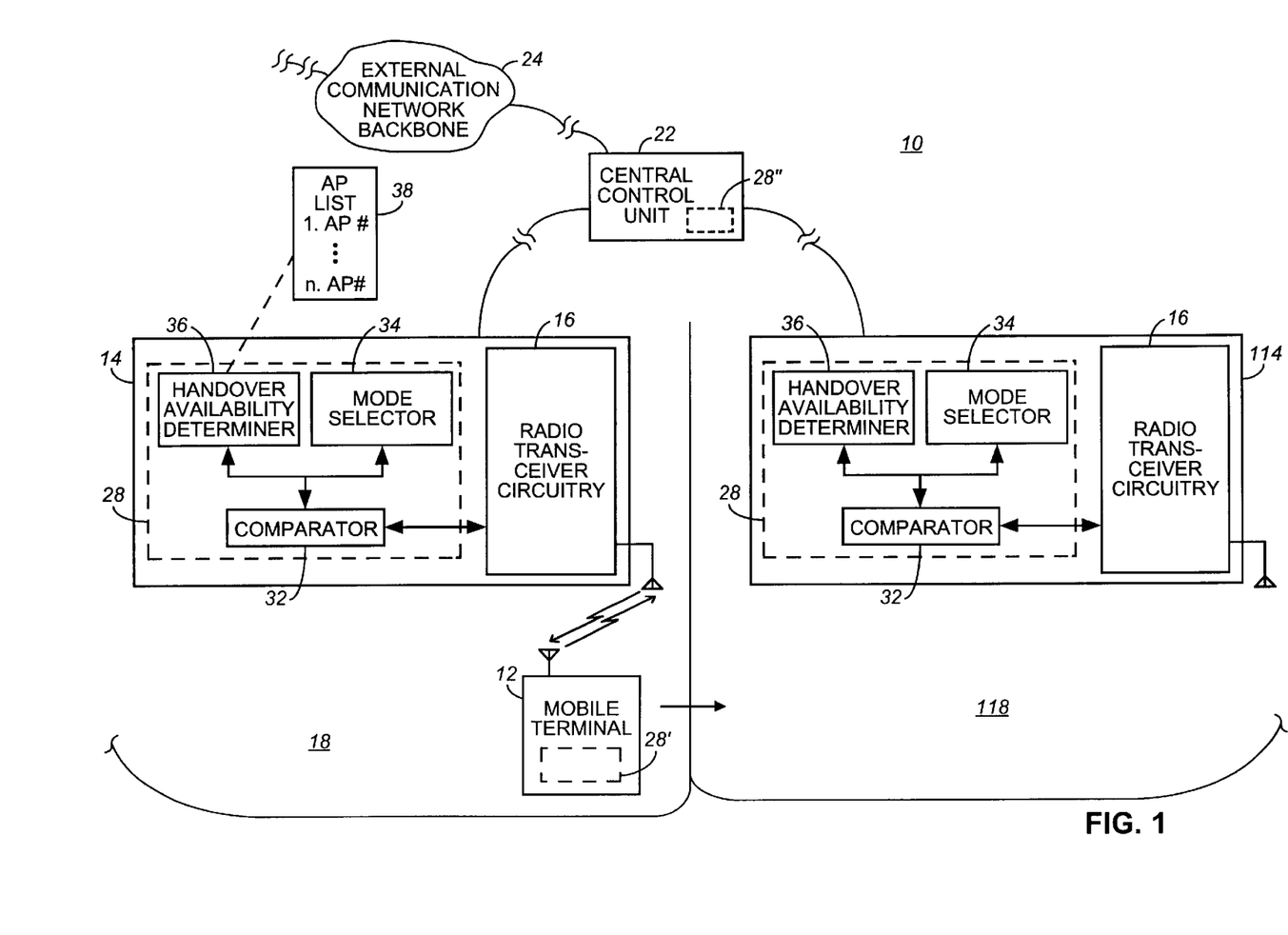
FIG. 1 is a showing of a communication system in which an embodiment of the present invention is operable.

FIG. 1 is an example of a communication system that provides for radio communications with and between a plurality of mobile terminals, of which mobile terminal 12 is an example. In another example, an access point covers the radio interface and fixed network bridge, with the access points connected to the fixed network, this example not requiring the CCU shown in FIG. 1. Communication system 10 forms a WLAN that provides radio communications with a plurality of mobile terminals 12 as set forth in the IEEE 802.11 standard, as well as, potentially, pursuant to a proprietary mode of operation, as is described in the above mentioned copending patent application. Other communication systems are analogous, and operation of the present invention is also operable in such other communication systems.

WLAN 10 includes a plurality of spaced-apart APs 14 and 114 that are individually located at two spaced-apart geographic locations. While only two APs 14,114 shown, in actual practice a greater number of APs are utilized. APs 14,114 are sometimes referred to as base stations or remote antenna devices (RADs). The term "access point", "AP", or "ap" shall generally be used herein to identify devices that form points of access to the network infrastructure of communication system 10. The term "mobile terminal", "MT" or "mt" shall generally be used to identify devices that form points of access to access points.

Each of the APs 14,114 includes radio transceiver circuitry 16 that is capable of transceiving radio communication signals with mobile terminals 12 when the mobile terminals are positioned within communication range of a particular AP. Generally, a mobile terminal 12 communicates with an AP 14,114 when the mobile terminal is positioned within a geographic area or cell 18,118 that is proximate to and defined by a given access point. In FIG. 1, cell 18 is associated with access point 14, mobile terminal 12 resides within cell 18, and cell 118 is associated with access point 114. Note that mode selector 34 is included only when an implementation of the invention uses proprietary radio link level messages, this not being a required implementation of the invention.

Access points 14,114 are coupled to a central control unit (CCU) 22. CCU 22 is typically a hub or an IP router. CCU 22 provides for connections to an external communication network backbone 24. Although not shown, other communication devices, such as other communication stations and other communication networks are typically coupled to communication network backbone 24. In this way, a communication path can be formed to provide for communications between a mobile terminal 12 and communication stations that are coupled, either directly or indirectly, to communication network backbone 24. Also, local communication between the plurality of mobile terminals 12 is permitted. In a communication between pairs of mobile terminals 12, the communication path formed therebetween includes two separate radio-links.

APs 14,114 include control elements 28 that perform various control functions related to operation of the respective APs. In FIG. 1 control elements 28 are each shown to include a comparator 32, a mode selector 34, and a handover availability determiner 36, which control elements are functional and are implemented in any desired manner, such as, for example, algorithms that are executable by processing circuitry. In another implementation, the functions that are performed by such elements are located elsewhere, such as at mobile terminals 12 as indicated by block 28', or at CCU 22 as indicated by block 28". Thus, the functions performed by the control elements can be distributed amongst several different devices.

Note that in accordance with the invention, comparator 32 includes security functions, and blocks 28 include medium access control (MAC) functions.

In the construction and arrangement of FIG. 1, and as taught by the above mentioned copending patent application, a communication pair that consists of an AP 14,114 and a mobile terminal 12 are operable pursuant to a IEEE 802.11 standard-mode when it is determined that the communication pair are not both proprietary-mode compatible, or they are operable pursuant to the proprietary-mode when it is determine that both members of the communication pair are proprietary-mode capable. In order to produce this result, a comparator 32 receives identifiers that identify the operable-mode of both the mobile terminal and the access point that form a communication pair. A mode selector 34 then selects the standard-mode of operation or the proprietary-mode of operation for communication between the mobile terminal and the access point.

As the physical position of a mobile terminal 12 changes from cell 18 to cell 118 during a given communication session, mobile terminal 12 leaves a first geographic area 18 that is serviced by AP 14, and then enter a second geographic area 118 that is serviced by AP 114. This cell-to-cell or area-to-area movement requires a handover of communications from the old-AP 14 that is associated with the first area 18 to the new-AP 114 that is associated with the second area 118, thus permitting continued communication with mobile terminal 12.

Handover availability determiner 36 provides indications to mobile terminal 12 of the available APs to which a handover of communications is possible, this availability being contained in an available access point list 38 that contains the identities of the APs that are available for the handover of communications.

Available access point list 38 can be communicated to the mobile terminals 12 at selected time intervals, or access point list 38 can be provided to each mobile terminal 12 when the mobile terminal is initially activated, or a network prefix or list of network prefixes can be used to provide the same goal.

In this explanation of the invention it will be assumed that a security association (SA) exists between mobile terminal 12 and the current or old-AP 14. That is, it will be assumed that mobile terminal 12 and AP 14 share the same common set of keys and other information that is necessary to achieve the security function(s). In accordance with the invention, this established and shared security association is transferred from old-AP 14 to new-AP 114, in a secure fashion, as mobile terminal moves from cell 18 to cell 118. This transfer is made in a very fast manner by minimizing the number of message that are needed to effect the transfer, and by eliminating the use of public key encryption. As a result, the interruption of a payload traffic transfer to and from mobile terminal 12 is minimized, any interruption of this type being very important for real-time services such as Voice over IP (VOIP) and video distribution.

In accordance with the invention, an authentication key or security association for both ends of the communication link (i.e. the link that involves mobile terminal 12 and AP 14) is generated by a sealable key management protocol, such as IKE, it being noted that Diffie-Hellman key exchange protocol can also be utilized.

Later, when mobile terminal 12 moves from cell 18 and its AP 14 to cell 118 and its AP 114, authentication during the handover process is achieved by the invention's simple challenge/response procedure. Also, security associations are transferred between old-AP 14 and new-AP 114, thus avoiding the need for a new key exchange during a handover from old-AP 14 to new-AP 114.

During the challenge/response procedure, new-AP 118 sends a challenge to mobile terminal 12, whereupon mobile terminal 12 sends a response to new-AP 118. In addition, mobile terminal 12 authenticates new-AP 118 in a similar manner during the handover.

The keys and related information are requested by new-AP 114, whereupon they are transferred from old-AP 14 to new-AP 114 in handover messages. Similarly, the exchange of the authentication challenges and the responses thereto are integrated into the handover signaling that occurs between new-AP 114 and mobile terminal 12.

Figure 2:
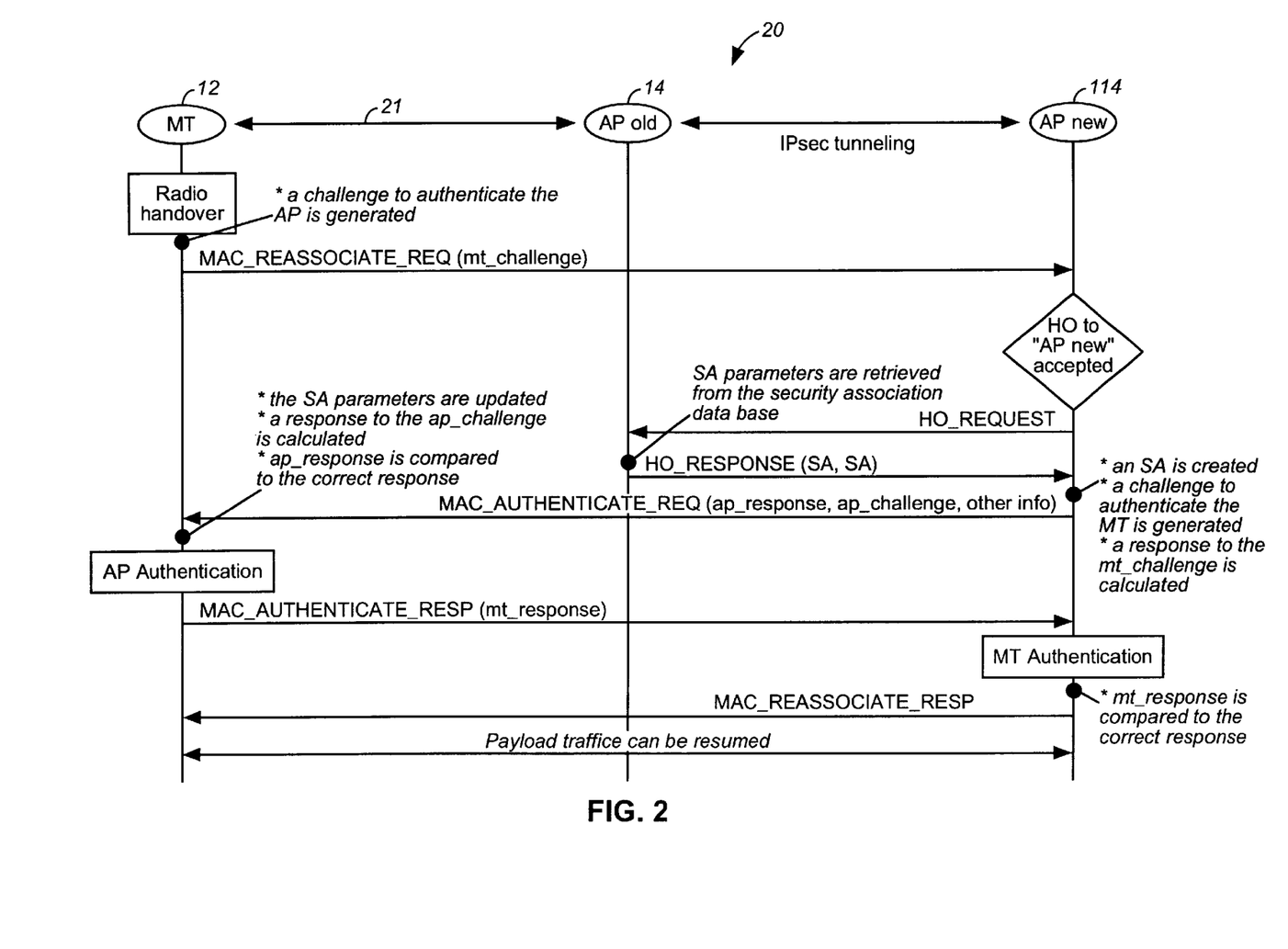
FIG. 2 is a showing of a forward handover process in accordance with the invention.

FIG. 2 shows a forward handover (HO) process 20 in accordance with the invention, this being a preferred embodiment of the invention. In forward handover process 20 the handover signaling is sent between mobile terminal (MT or mt) 12 and new-access point (AP or ap) 114. This type of handover is especially useful when radio link 21 is lost without prior warning.

Figure 3:
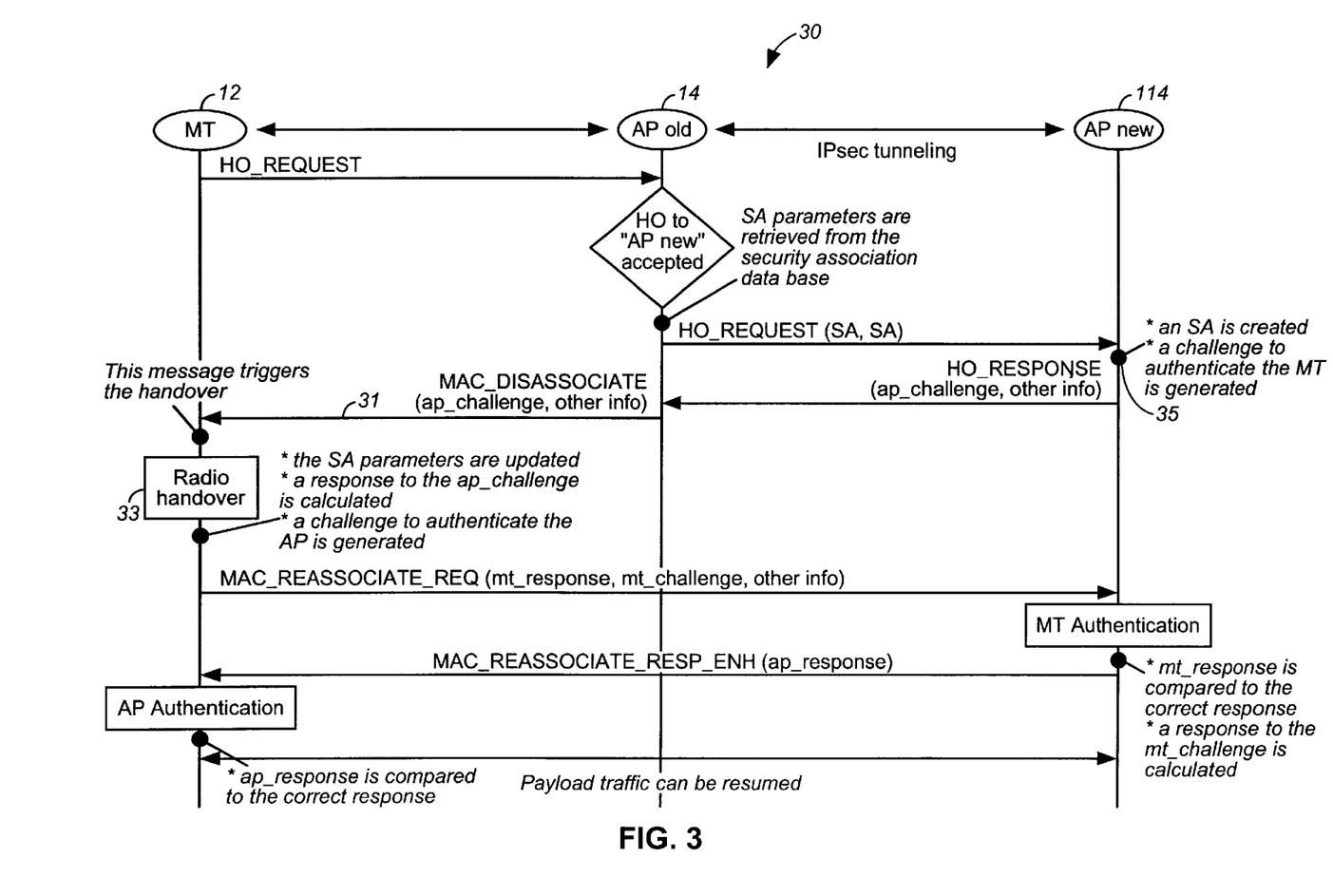
FIG. 3 is a showing of a backward handover process in accordance with the invention.

FIG. 3 shows a backward handover (HO) process 30 in accordance with the invention. In backward handover process 30 handover is requested by mobile terminal 12 communication with old-AP 14, this resulting in a somewhat different message sequence than is shown in FIG. 2. During a backward handover a beneficial option is to use the radio interface message 31 that carries the authentication challenge from old-AP 14 to mobile terminal 12 to also trigger backward handover 33. That is, authentication challenge 31 is used to indicate to mobile terminal 12 that it should disconnect from old-AP 14 and connect to new-AP 114 whereat a security association (SA) 35 has already been prepared for mobile terminal 12.

As used herein the term "old-AP" means an access point such as access point 14 with which mobile terminal 12 is originally or currently communicating. Thus, the term "old-AP" also means a "current-AP" with which mobile terminal 12 is communicating at a time that a communication handover is required.

As used herein the term "new-AP" means an access point such as access point 114 with which mobile terminal 12 must begin communicating because the mobile terminal has geographically moved from and old cell 18 to a new cell 118. Thus, the term "new-AP" also means a "future-AP" with which mobile terminal 12 will communicating after a communication handover has been completed.

In FIGS. 2 and 3 IEEE 802.11 message names are used, and additional parameters of the handover messages are shown. However, this naming of the messages is not critical to the spirit and scope of this invention since the invention can be accomplished in other systems than IEEE 802.11. The use of extended MAC (medium access control) messages in FIGS. 2 and 3 to carry the additional parameters over the radio interfaces is however beneficial in that the need to send additional messages is avoided.

In order to guarantee security, it is desirable that messages that carry the keys be ciphered. Therefore, the transfer of security association or SA and other control traffic between APs 14,114 is shown as being encrypted and authenticated by IPsec.

The specific means whereby it is determined that mobile terminal 12 has physically moved relative to cells 18,118, such that handover is required, is not critical to the present invention. For example, the procedure can be analogous to that used in conventional time-division cellular systems that use mobile assisted handover procedures. In general, mobile terminal 12 tunes to control channels of the base stations or APs of adjacent cells such as cells 18,118, for example at timed intervals. The signal strength, or some other signal characteristic such as bit error rate, of the signals that are broadcast on these control channels are then measures or sensed by mobile terminal 12. Uplink signals that are based upon this measurement at mobile terminal 12 are then sent by the mobile terminal to network 10, whereupon network 10 determines whether a communication handover should be effected. When it is determined that handover is required, instructions are sent to mobile terminal 12, and the communication handover process of FIG. 2 or FIG. 3 begins.

Figure 4A:
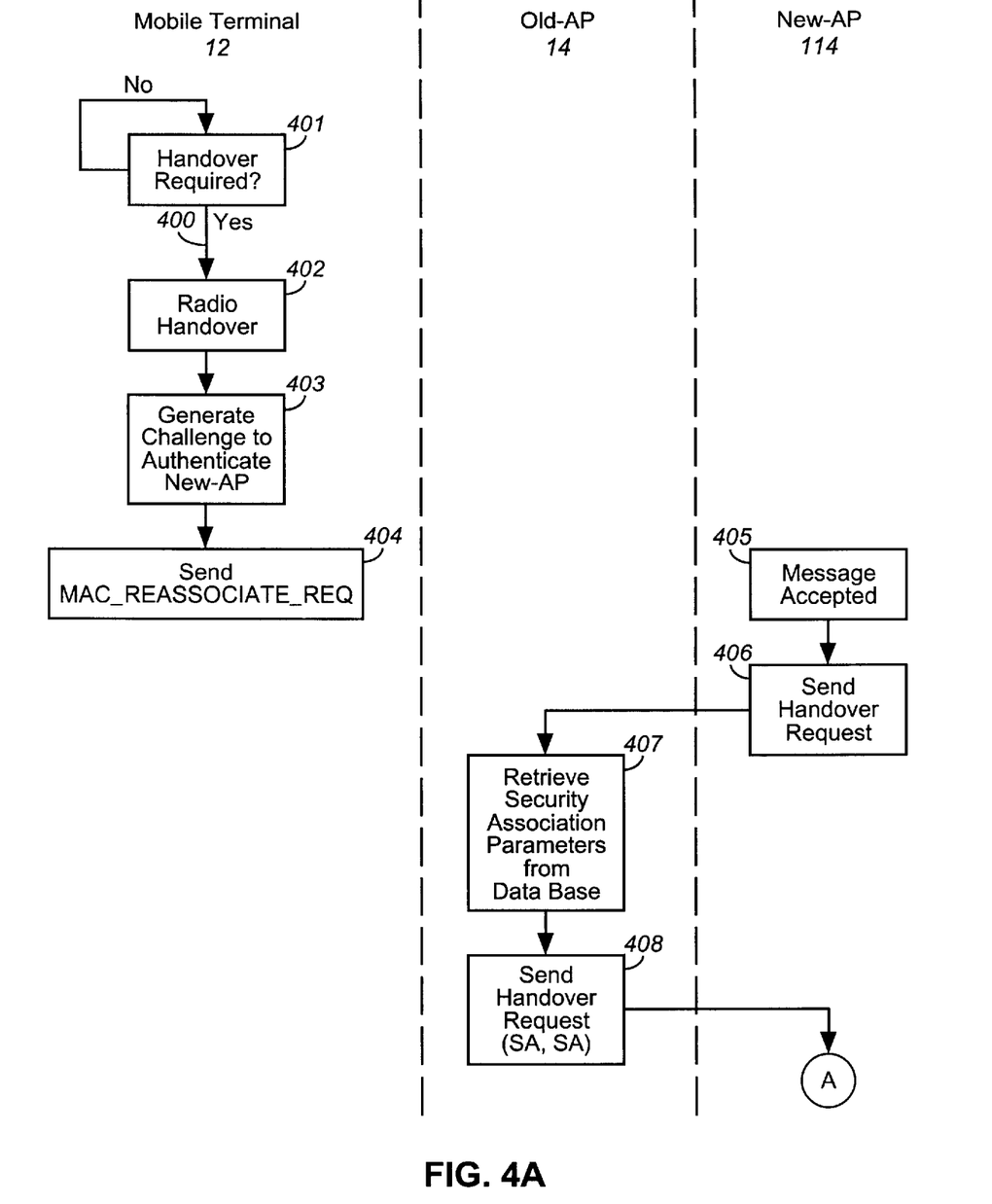
FIGS. 4A–4C provide another showing of the forward handover process of FIG. 2.
Figure 4B:
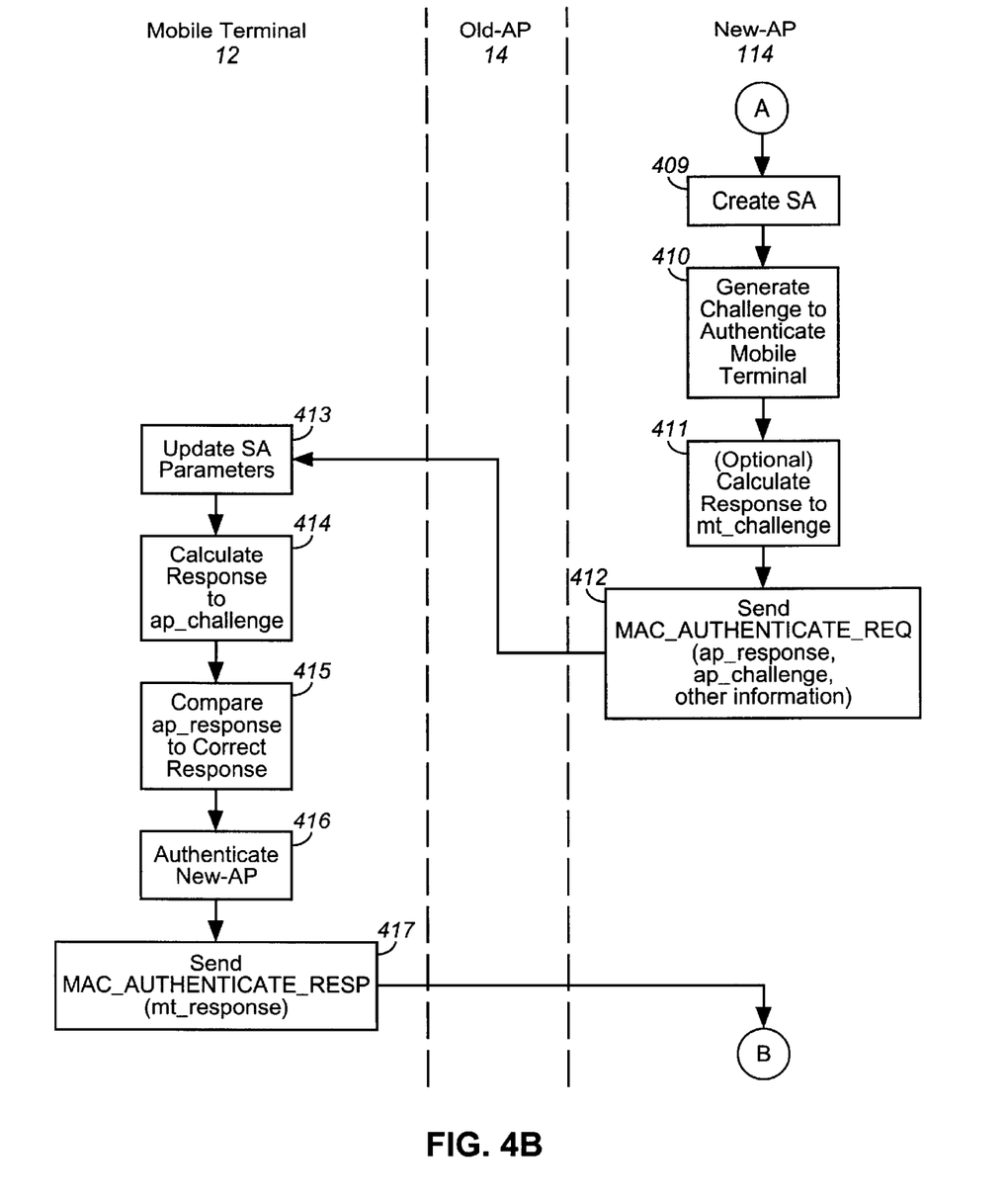
Figure 4C:
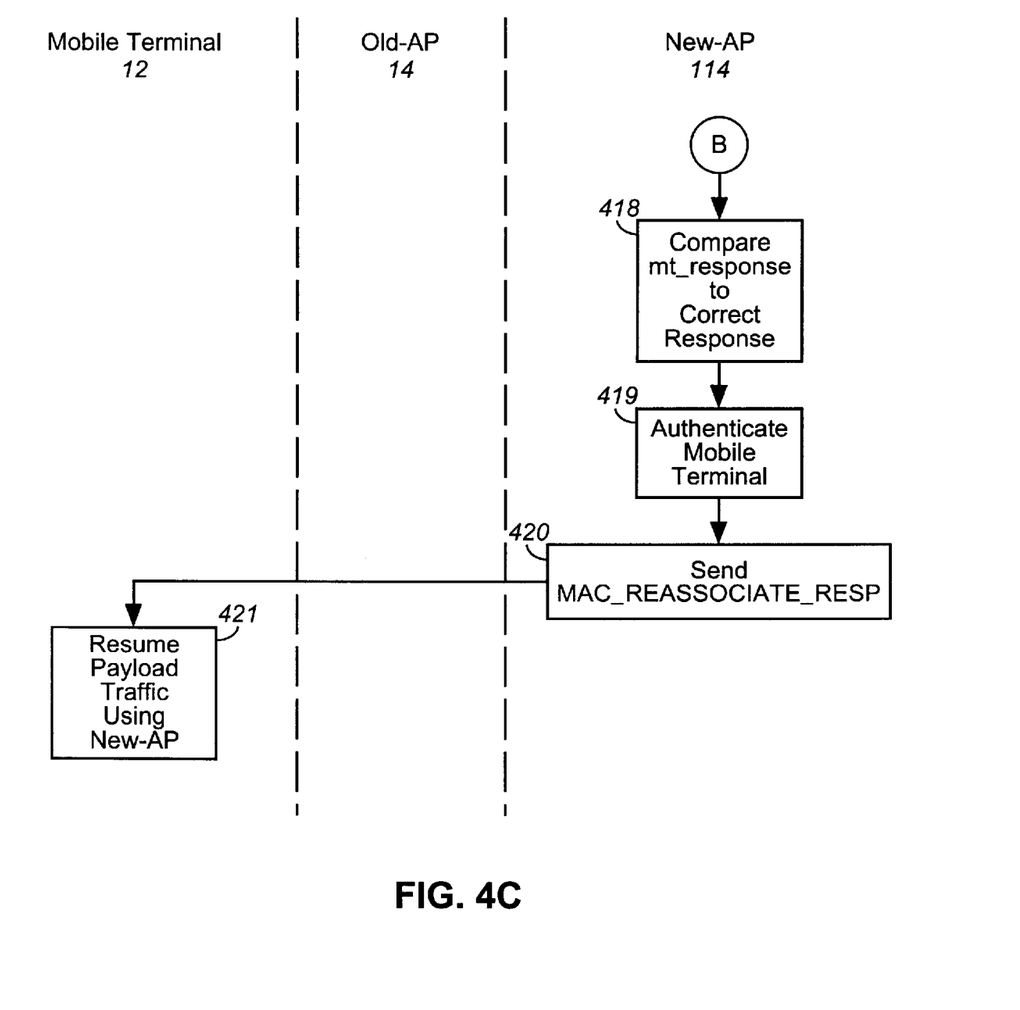

FIGS. 4A–4C provide another showing of forward handover process 20 wherein communication handover of mobile terminal 12 is provided relative to old-AP 14 and new-AP 114 as mobile terminal moves from cell 18 to cell 118. In this figure a mobile terminal or MT is also referred to using the term "mt", and an access point or AP is also referred to using the term "ap".

With reference to FIG. 4A, forward handover process 20 is initiated at mobile terminal 12 by the yes output 400 of event 401 indicating that handover is required. Mobile terminal 12 now operates at function 402 to activate its radio handover function.

At function 403 mobile terminal 12 generates a challenge to new-AP 114, whereupon at function 404 a MAC_REASSOCIATE_REQ message that contains "mt_challenge" is sent to new-AP 114.

At function 405, new-AP 114 accepts message 404, whereupon new-AP 114 operates at function 406 to send a handover request to old-AP 14.

Old-AP 14 now operates at function 407 to retrieve security association parameters SA,SA from its security association database. Old-AP 14 then operates at function 408 to send a handover request that contains the parameters SA,SA to new-AP 114.

With reference to FIG. 4B, new-AP 114 now operates at function 409 to create a security association (SA), operates at function 410 to generate a challenge to authenticate mobile terminal 12, operates at function 411 to calculate a response to the "mt_challenge" that was contained in FIG. 4A's message 404, and operates at function 412 to send an MAC_AUTHENTICATE_REQ message to mobile terminal 12. Message 412 contains the "ap_response" that was calculated by operation of function 411, contains the "ap_challenge" that was generated by operation of function 410, and contains "other information".

Mobile terminal 12 now operates at function 413 to update its security association parameters, operates at function 414 to calculate a response to the "ap_challenge" that was received by way of message 412, and operates at function 415 to compare the "ap_response" that was received by way of message 412 to the correct or expected response.

When the comparison performed by function 415 produces a correct compare, function 416 operates to authenticate new-AP 114, whereupon function 417 operates to send a MAC_AUTHENTICATE_RESP message to new-AP 114, this message containing the "mt_response" that was calculated at function 414.

With reference now to FIG. 4C, at function 418 new-AP 114 operates to compare the "mt_response" that it received by way of message 417 to the proper or correct response, and when this comparison produces the correct compare, function 419 operates to authenticate mobile terminal 12. New-AP 114 then operates at function 420 to send a MAC_REASSOCIATE_RESP message to mobile terminal 12, whereupon handover is completed and mobile terminal 12 thereafter operates at function 421 to resume its payload traffic using new-AP 114.

Figure 5A:
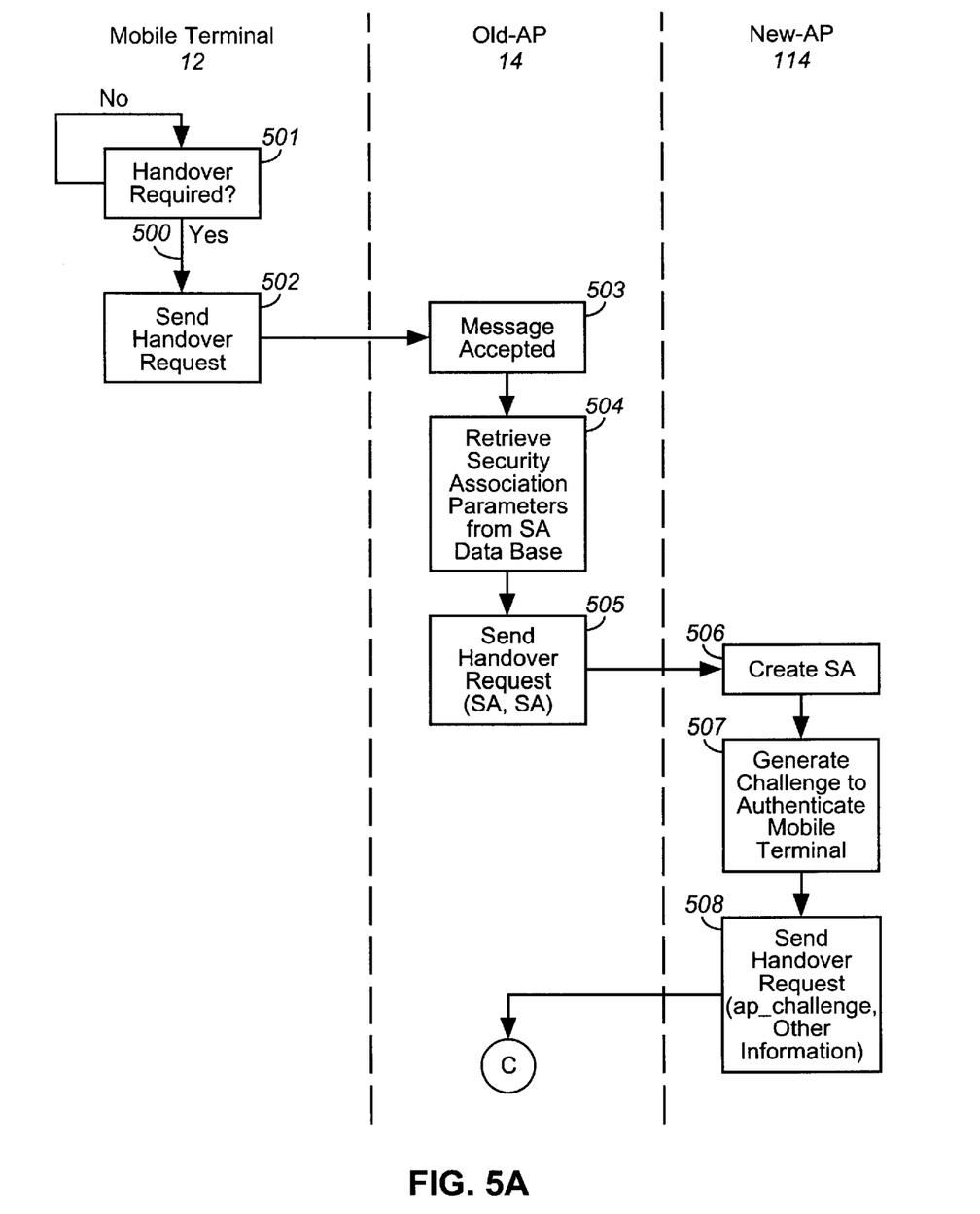
FIGS. 5A–5C provide another showing of the backward handover process of FIG. 3.
Figure 5B:
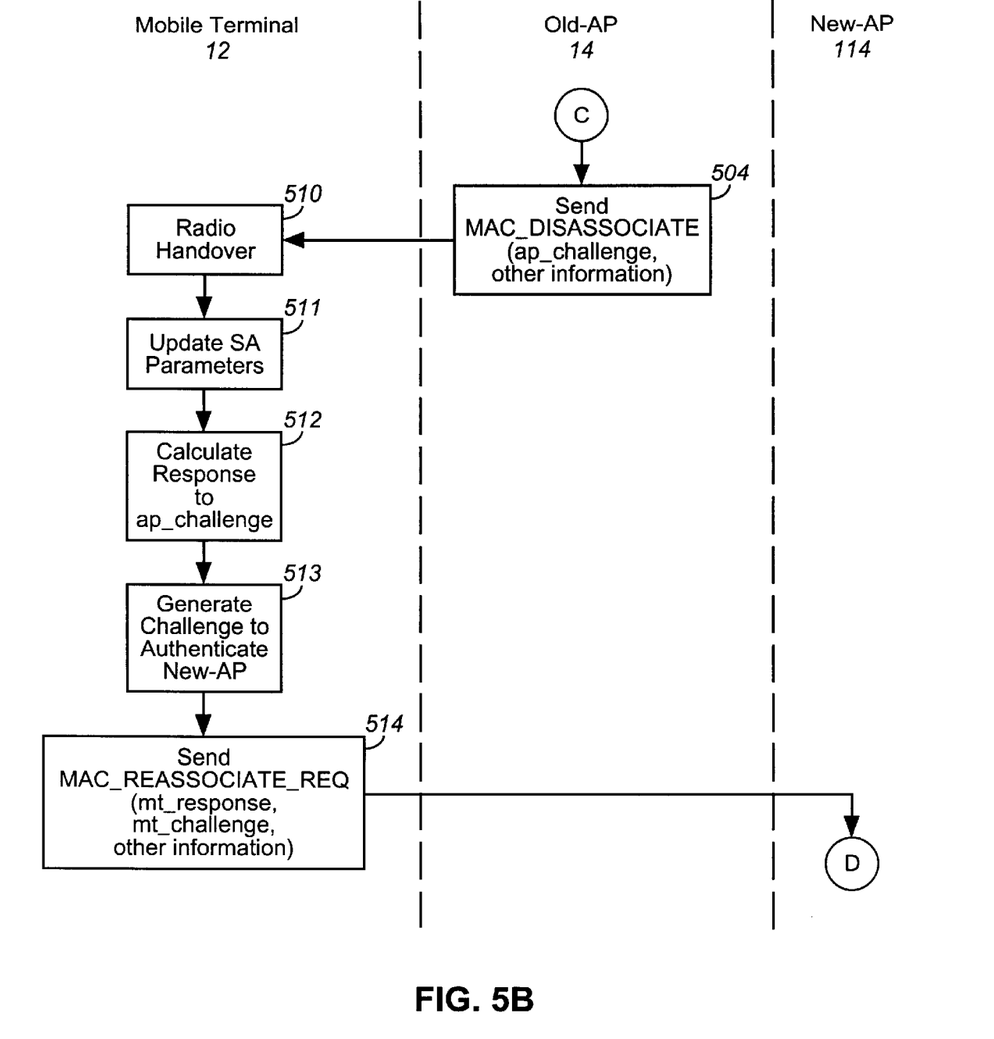
Figure 5C:
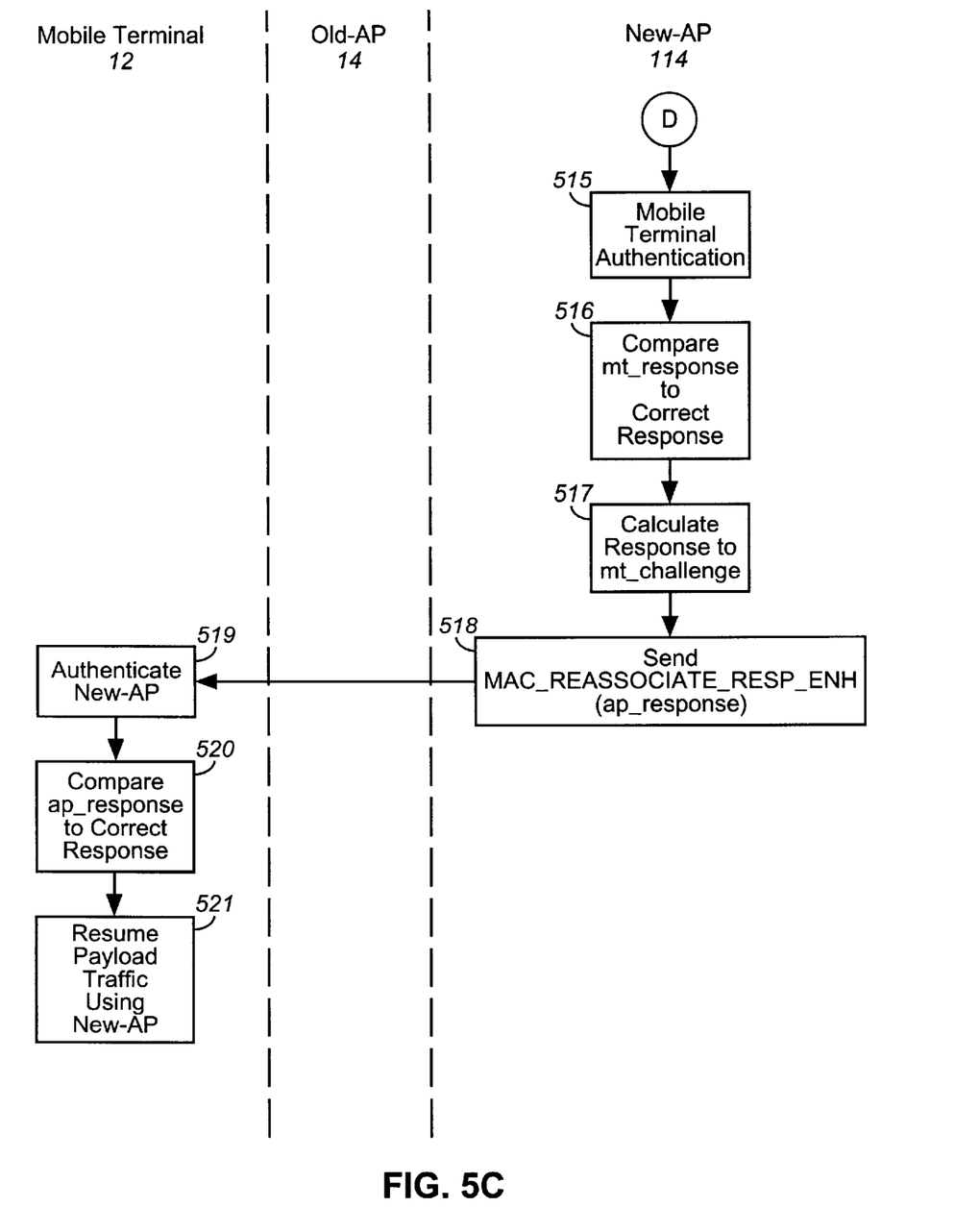

FIGS. 5A–5C provide another showing of backward handover process 30 wherein communication handover is provided for mobile terminal 12 relative to old-AP 14 and new-AP 114. In this figure a mobile terminal or MT is also referred to using the term "mt", and an access point or AP is also referred to using the term "ap".

With reference to FIG. 5A, backward handover process 30 is initiated at mobile terminal 12 by the yes output 500 of event 501 indicating that handover is required. Mobile terminal 12 now operates at function 502 to send a handover request to old-AP 14.

When message 502 is received at old-AP 14, function 503 accepts the message, function 504 operates to retrieve security association parameters SA,SA from its security association (SA) data base, and function 505 operates to send a handover request that contains the parameters SA,SA to new-AP 114.

Using the parameters SA,SA that were received in message 505, new-AP 114 now operates at function 506 to create its own security association (SA). New-AP 114 then operates at function 507 to generate a challenge to authenticate mobile terminal 12, and at function 508 a handover request is sent to old-AP 14, this request 508 including the "ap_challenge" that was generated at function 507, and "other information".

With reference now to FIG. 5B, in response to message 508, old-AP 14 operates at function 509 to send a MAC_DISASSOCIATE message to mobile terminal 12, this message containing the "ap challenge" and the "other information" that was old-AP 14 received from new-AP 114 by way of message 508.

In response to message 509, mobile terminal 12 activates its radio handover function at 510. At function 511 mobile terminal 12 now updates its security association parameters, at function 511 mobile terminal 12 operates to calculate a response to the "ap_challenge" portion of messages 508 and 509, at function 513 mobile terminal 12 operates to generate a challenge to authenticate new-AP 114, and at function 514 mobile terminal 12 send a MAC_REASSOCIATE_REQ message to new-AP 114. Message 514 contains the "mt_response" that was calculated at function 511, the "mt_challenge" that was generated at function 512, and "other information".

With reference now to FIG. 5C, function 515 provides authentication of mobile terminal 12, function 516 compares the "mt_response" that was received by way of message 513 to the correct or expected response, function 517 calculates a response to the "mt_challenge" that was received by way of message 513, and function 518 operates to send a MAC_REASSOCIATE_RESP_ENH message to mobile terminal 12, message 518 containing the "ap_response" that was calculated by function 517.

At function 519 mobile terminal 12 operates to authenticate new-AP 114 by comparing at function 520 the "ap_response" contained in message 518 with the correct or expected response, and as a result of this correct comparison, function 521 causes mobile terminal 12 to resume payload traffic using new-AP 114.

From the above it can be seen that the present invention provides a method/apparatus the provides for information security when communication with a given mobile-terminal 12 is handed-over from a first access-point 14 to a second access-point 114. A communication system 10 is provided having a plurality of access-points, each access point serving a different geographic area that is within an overall geographic area that is served by communication system 10, and a plurality of mobile-terminals 12 are provided wherein the mobile-terminals are individually physically moveable within the overall geographic area and between the different geographic areas.

In the handover process/apparatus of the invention, first it is sensed when a given mobile-terminal 12 moves from a communication-influence with a first access-point 14 into a communication-influence with a second access-point 114 (see 401 of FIG. 4A and 501 of FIG. 5A).

When such a move is sensed, security-association-parameters are fetched from first access-point 14 (see 407 of FIG. 4A and 504 of FIG. 5A), a security association is created at second access point 114 in accordance with the retrieved security-association-parameters (see 409 of FIG. 4B and 506 of FIG. 5A), and a security association created at given mobile-terminal 12 in accordance with the retrieved security-association-parameters (see 413 of FIG. 4B and 510 of FIG. 5B).

Also, when such a move is sensed, an authenticate-access-point-challenge is sent from given mobile-terminal 12 to the second access-point 114 (see 404 of FIG. 4A and 513 of FIG. 5B), and an authenticate-mobile-terminal-challenge is sent from second access-point 114 to given mobile-terminal 12 (see 412 of FIG. 4B and 508 of FIG. 5A). Note that the above described access-point-challenge is an optional feature of the invention.

In response to the authenticate-access-point-challenge that is received from given mobile-terminal 12, second access-point 114 now generates an authenticate-access-point-response (see 411 of FIG. 4B and 516 of FIG. 5C), and this authenticate-access-point-response is sent to given mobile terminal 12 (see 412 of FIG. 4B and 517 of FIG. 5C).

In response to the authenticate-mobile-terminal-challenge that is received from second access-point 114, given mobile-terminal 12 now calculates an authenticate-mobile-terminal-response (see 414 of FIG. 4B and 511 of FIG. 5B), and this authenticate-mobile-terminal-response is sent to second access-point 114 (see 417 of FIG. 4B and 513 of FIG. 5B).

A first-compare at given mobile-terminal 12 now operates to compare the authenticate-access-point-response that is received from second access-point 114 to a correct or an expected response (see 415 of FIG. 4B and 519 of FIG. 5C), and a second-compare at second access-point 114 now operates to compare the authenticate-mobile-terminal-response that is received from given mobile-terminal 12 to a correct or an expected response (see 418 of FIG. 4C and 515 of FIG. 5C).

Finally, communication is initiated between given mobile-terminal 12 and second access-point 114 based upon the outcome of the first-compare and the second-compare (see 421 of FIG. 4C and 520 of FIG. 5C).

Figure 6:
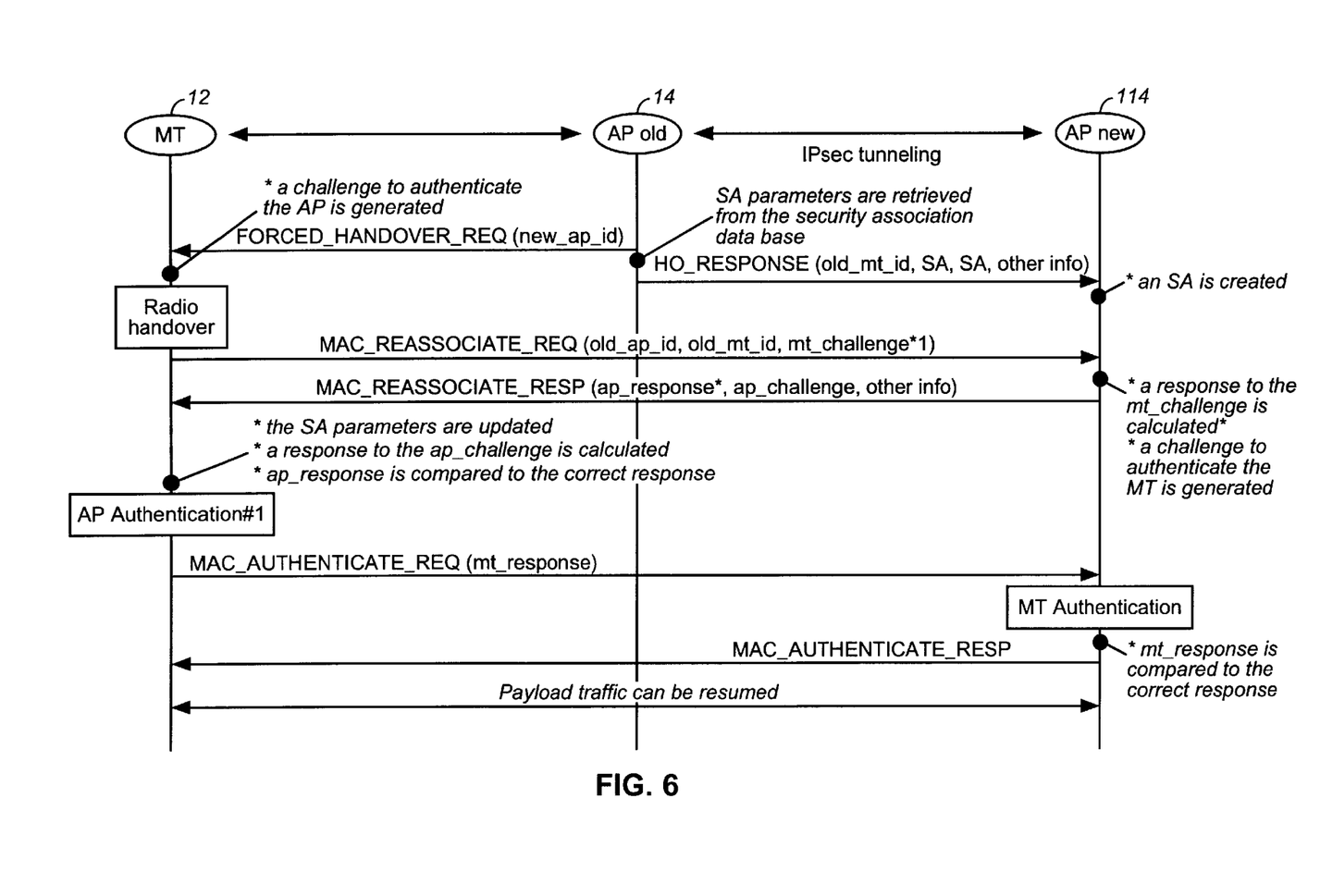
FIG. 6 is a showing of a HIPERLAN/2 forced handover in accordance with the invention.
Figure 7:
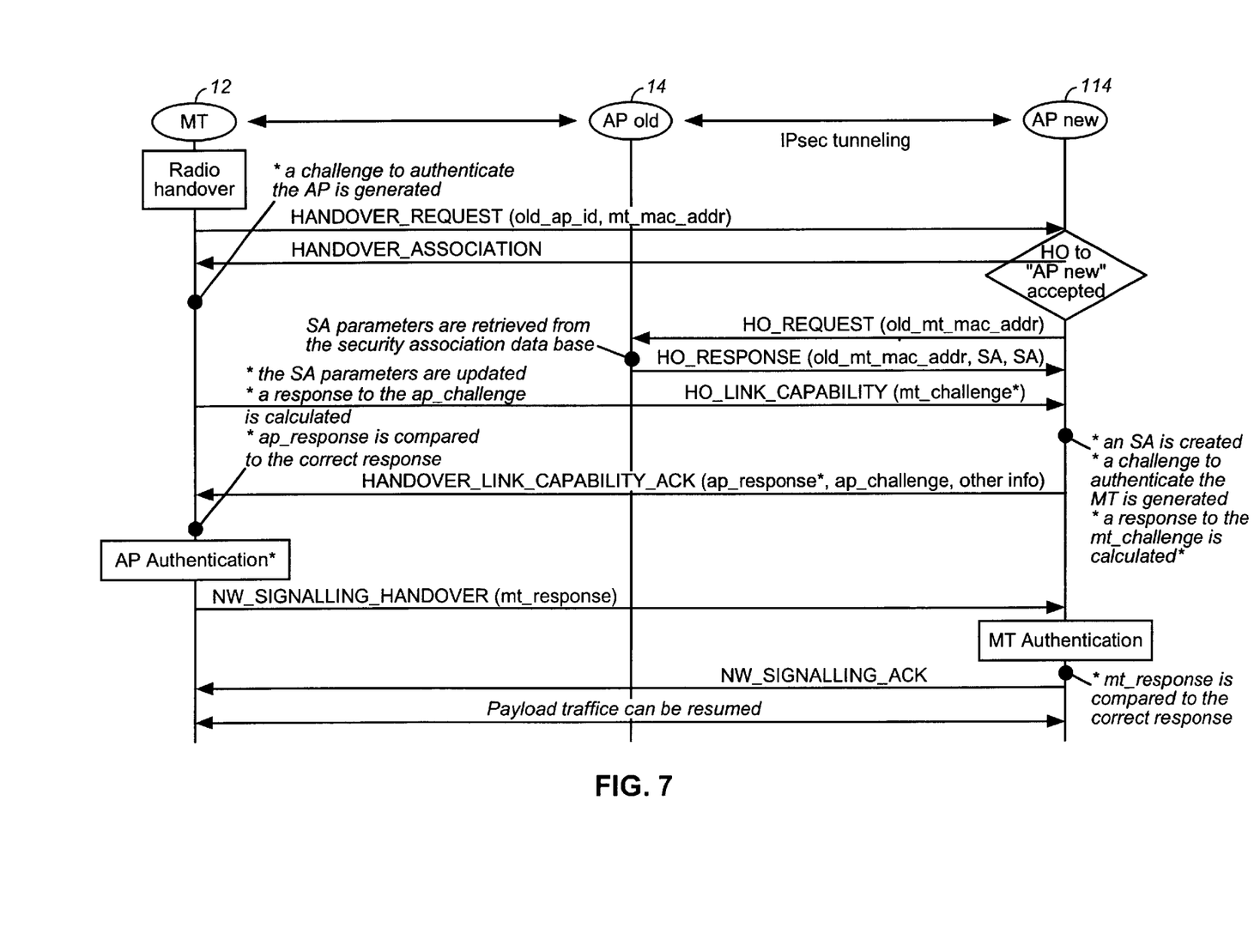
FIG. 7 is a showing of a HIPERLAN/2 forward handover in accordance with the invention.

FIGS. 6 and 7 show two additional embodiments of the invention. While the specific details of the FIGS. 6 and 7 embodiments differ in the specific details thereof, the content of the FIGS. 6 and 7 embodiments will be readily apparent by way of a comparison to the above described FIGS. 2, 3, 4A–4B, and 5A–5B embodiments of the invention.

While the invention has been described in detail while making reference to preferred embodiments thereof, no part of this detailed description is not to be taken as a limitation on the spirit and scope of the invention, since it is known that others skilled in this art will readily visualize yet other embodiments that are within the spirit and scope of this invention once the invention is generally known.

What is claimed is:

1. In a communication system having a plurality of access-points, each access point serving a different geographic area within an overall geographic area that is served by said communication system, said communication system further having a plurality of mobile-terminals that are each physically moveable within said overall geographic area and between said different geographic areas, a method of providing information security when communication with a given mobile-terminal is handed-over from a first access-point to a second access-point, said method comprising the steps of:

sensing when said given mobile-terminal moves from a communication-influence with said first access-point into a communication-influence with said second access-point;

responding to said sensing step by retrieving security-association-parameters from said first access-point, by creating a security association at said second access-point in accordance with said retrieved security-association-parameters, and by creating a security association at said given mobile-terminal in accordance with said retrieved security-association-parameters;

responding to said sensing step by sending an authenticate-access-point-challenge from said given mobile-terminal to said second access-point, and by sending an authenticate-mobile-terminal-challenge from said second access-point to said given mobile-terminal;

generating an authenticate-access-point-response at said second access-point in response to said authenticate-access-point-challenge received from said given mobile-terminal;

sending said authenticate-access-point-response to said given mobile-terminal;

generating an authenticate-mobile-terminal-response at said given mobile-terminal in response to said authenticate-mobile-terminal-challenge received from said second access-point;

sending said authenticate-mobile-terminal-response to said second access-point;

first-comparing said authenticate-access-point-response to a correct response at said given mobile-terminal; and second-comparing said authenticate-mobile-terminal-response to a correct response at said second access-point.

2. The method of claim 1 wherein said plurality of mobile-terminals have a media access control layer and compatible physical layers, and wherein said messages are media access control messages.

3. The method of claim 2 wherein said messages are transmitted within a wireless LAN such as IEEE 802.11 or HIPERLAN/2 multiple access messages.

4. The method of claim 3 including the steps of:

providing said communications system as a LAN;

providing a server within said LAN;

providing key management and security association re-establishment within said LAN during a communication handover, without requiring a modification to an end-to-end security association, as communication continues during said communications handover, such that said communications handover affects only security functions between said mobile-terminal and said first and second access-points.

5. The method of claim 4 wherein said LAN includes Internet Protocol Security based security association between said plurality of access-points and said plurality of mobile-terminals.

6. The method of claim 1 wherein said communication system is a WLAN communication system wherein a security protocol is used to provide end-to-end security for data packets.

7. The method of claim 6 wherein said end-to-end security is provided by authenticating and/or encrypting said data packets, and wherein said security protocol provides symmetric cryptography requiring use of a same encryption and/or authentication key at both ends of a communication link.

8. The method of claim 7 wherein a sealable key management protocol operates to generate symmetric keys for said security protocol.

9. The method of claim 7 including the step of:

providing a session dependent dynamic encryption key between said given mobile-terminal and said second access-point; and transferring an active security association from first access-point to said second access-point as said given mobile-terminal moves within communication coverage that is provided by said communication system.

10. The method of claim 1 wherein an authentication key is provided for both ends of a communication pair that is made up of said given mobile-terminal and said first and second access-points, said authentication key being generated by a scaleable key management protocol.

11. The method of claim 1 wherein an authentication key or security association exists between said given mobile-terminal and said first access-point in accordance with a scaleable key management protocol; and wherein security associations are transferred between said plurality of access-points in order to avoid the need for a new key exchange during a communication handover.

12. The method of claim 11 wherein said sealable key management protocol is IKE, and wherein security associations are transferred between said first access-point and said second access-point in manner to avoid a need for a new key exchange during said communication handover from said first access-point to said second access-point.

13. The method of claim 12 including the step of encrypting messages that that carry the keys.

14. The method of claim 1 further comprising the step of initiating communication between said given mobile-terminal and said second access-point based upon said first-comparing step and said second-comparing step.

15. A challenge/response method for maintaining a security association when a communication-handover event occurs in a radio communications system, comprising the steps of:

providing a communication-pair that is made up of an access-point and a mobile-terminal that is experiencing a communication handover to said access-point;

sending a first-challenge from said mobile-terminal to said access-point;

sending a second-challenge from said access-point to said mobile-terminal;

calculating a first-response to said received first-challenge at said access-point;

sending said first-response to said mobile-terminal;

calculating a second-response to said received second-challenge at said mobile-terminal;

sending said second-response to said access-point;

first-comparing said received first-response to a correct response at said mobile-terminal;

second-comparing said received second-response to a correct response at said access-point; and beginning communication between said access-point and said mobile-terminal as a function of said first-comparing step and said second-comparing step.

16. The method of claim 15 wherein said radio communications system is selected from the group IEEE 802.11 and HIPERLAN.

17. The method of claim 15 wherein said mobile-terminal is in communication with a another access-point prior to said communication-handover event, and wherein said security association is a security association that exists between said mobile-terminal and said another access-point.

18. Apparatus for maintaining a given security-association in a radio communications system when a communication-handover occurs as a mobile-terminal physically moves from a first geographic area that is served by a first communication-access-point to a second geographic area that is served by a second communication-access-point, said mobile-terminal initially forming a first communication-pair with said first communication-access-point, and after said communication-handover said mobile-terminal forming a second communication-pair with said second communication-access-point, each member of said first communication-pair having said given security-association associated therewith, the apparatus comprising;

first means at said mobile-terminal for sensing a need to initiate said communication-handover;

second means within said radio communications system and responsive to said first means sensing said need to initiate said communication-handover for establishing said given security-association at said second communication-access-point;

third means at said mobile-terminal for generating an access-point-challenge as a function said given security-association, and for sending said access-point-challenge to said second communication-access-point;

fourth means at said second communication-access-point for generating a mobile-terminal-challenge as a function of said given security-association established at said second communication-access-point, and for sending said mobile-terminal-challenge to said mobile-terminal;

fifth means at said mobile-terminal and responsive to said mobile-terminal-challenge for generating a mobile-terminal-response as a function of said given security-association, and for sending said mobile-terminal-response to said second communication-access-point;

sixth means at said second communication-access-point and responsive to said access-point-challenge for generating an access-point-response as a function of said given security-association established at said second communication-access-point, and for sending said access-point-response to said mobile-terminal;

seventh means at said mobile-terminal and responsive to said access-point-response for determining if said access-point-response is correct as a function of said given security-association;

eighth means at said second communication-access-point and responsive to said mobile-terminal-response for determining if said mobile-terminal-response is correct as a function of said given security-association established at said second communication-access-point; and ninth means within said radio communications system and responsive to said eighth and ninth means for establishing said communication-handover when both said mobile-terminal-response and said access-point-response are correct.

19. The apparatus of claim 18 wherein said radio communications system is selected from the group IEEE 802.11 and HIPERLAN.

20. A method for maintaining a given security-association in a radio communications system when a communication-handover of a mobile terminal occurs, said mobile-terminal initially forming a first communication-pair with said first communication-access-point, and after said communication-handover said mobile-terminal forming a second communication-pair with said second communication-access-point, each member of said first communication-pair having said given security-association associated therewith, the method comprising the steps of;

sensing a need to initiate said communication-handover;

responding to said need to initiate said communication-handover and establishing said given security-association at said second communication-access-point in response thereto;

generating at said mobile-terminal an access-point-challenge as a function said given security-association;

sending said access-point-challenge to said second communication-access-point;

generating at said second communication-access-point a mobile-terminal-challenge as a function of said given security-association established at said second communication-access-point;

sending said mobile-terminal-challenge to said mobile-terminal;

responding to said mobile-terminal-challenge at said mobile-terminal and generating a mobile-terminal-response as a function of said given security-association;

sending said mobile-terminal-response to said second communication-access-point;

responding to said access-point-challenge at said second communication-access-point and generating an access-point-response as a function of said given security-association established at said second communication-access-point;

sending said access-point-response to said mobile-terminal;

responding to said access-point-response at said mobile-terminal and determining if said access-point-response is correct as a function of said given security-association;

responding to said mobile-terminal-response at said second communication-access-point and determining if said mobile-terminal-response is correct as a function of said given security-association established at said second communication-access-point; and establishing said communication-handover when both said mobile-terminal-response and said access-point-response are correct.

* * * * *